April 25, 1950      J. T. FOUFOUNIS      2,504,949
SELF-VIEW FINDER FOR PHOTOGRAPHY
Original Filed Jan. 19, 1946
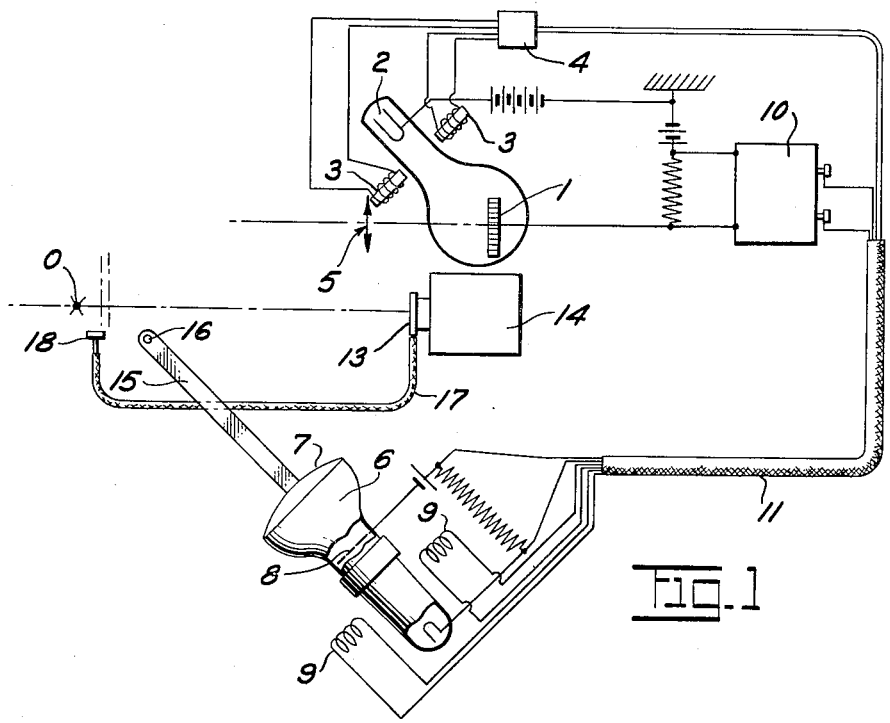
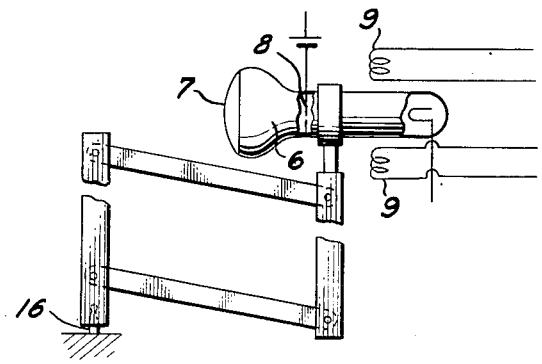
INVENTOR
JEAN THEODORE FOUFOUNIS
BY
*J. Delattre-Seguy*
ATTORNEY Patented Apr. 25, 1950

2,504,949

UNITED STATES PATENT OFFICE 2,504,949

SELF-VIEW FINDER FOR PHOTOGRAPHY

Jean Theodore Foufounis, Paris, France

Original application January 19, 1946, Serial No. 642,260. Divided and this application October 21, 1947, Serial No. 781,116. In France April 5, 1945

6 Claims. (Cl. 178—6.8)

The present invention, which is a division of my copending application No. 642,260 filed on January 19, 1946, now Patent No. 2,496,404, granted February 7, 1950, relates to a self-view-finder for the photography and motion-picture photography of portraits, by the help of which the user is able to photograph himself after having selected a suitable attitude or attitudes and judge of the ultimate result in the finder, which is intended to show an image identical or substantially identical to the image formed on the sensitive plate or film.

The invention has for its object to provide such a self-view-finder, which is able to give, from the user illuminated with such a moderation that he may not be dazzled, an image sufficiently bright for said user to get a clear appreciation of the result which will be ultimately obtained in the printed picture.

The invention has also for its object to provide a self-view-finder which comprises a finder objective, a screen for exhibiting to the user his real image formed by said objective, means on the optical path between said objective and screen for converting the light energy into electrical energy, an amplifier and means for reconverting the electrical energy into an optical image of greater brightness on said screen.

Another object of said invention is to provide a self-view-finder in which the means for converting the light energy into electrical energy and the means for reconverting the electrical energy into an optical image, consist respectively of an iconoscope and an oscillograph, as used in the television art.

Further features of the invention will be made clear from the following description, referring to the figure of the accompanying drawing, in which:

Fig. 1 illustrates by way of an example an embodiment of the invention, and

Fig. 2 illustrates another form of pivotable attachment which can be used.

In said embodiment, the brightness of the real image is amplified by means of an iconoscope and oscillograph device of the type used in television.

Referring to Fig. 1, it will be reminded that the iconoscope comprises a great number of photoelectric elements 1 (Zworykin's iconoscope), bombarded by an electronic gun 2, the trajectory of the electrons being deflected by electro-magnetic fields produced by coils 3, through which currents of serrated form are sent from a generating apparatus 4, and which are intended to explore the real image formed on the iconoscope by an objective lens 5. The currents of serrated form passing through the iconoscope's circuit are usually amplified and are used to modulate a carrier-wave for radio-transmission. At the receiving set, the current received supplies the cathode-grid circuit of an oscillograph 6, comprising a fluorescent screen 7. Under the effect of the fluctuations in the potential of grid 8, the electrons alternatively pass through the grid or are stopped by the latter. On their path between the cathode and the screen, the electrons are deflected from their trajectory by periodically fluctuating electromagnetic fields produced by coils 9 and synchronized with those used for exploring iconoscope 1, so as to reconstruct the image received.

In applying such a device to the self-view-finder according to the invention, no radio transmission is required, so that both the modulator of the radio transmitter and the receiver are superfluous. Oscillograph 6 is directly connected by a flexible conductor cable 11 to the exit terminal of amplifier 10, which is mounted beyond iconoscope 1, while coils 9, which produce the magnetic field in oscillograph 6, are supplied with the same current of serrated form which supplies coils 3 used to produce the field for exploring the surface of iconoscope 1.

The image of the user O, can be formed on the iconoscope, either by means of the objective lens 13 of the camera 14, in the event of a reflex device, or by an auxiliary finder objective lens (5), as close as possible to the camera lens, so as to reduce the parallax error.

Oscillograph 6 is mounted on an arm 15, pivoted for example at 16, so as to be brought by the user into the field of vision.

The device is completed by means enabling the user to actuate the shutter of the camera. Said means comprise, for instance a shutter actuating cable 17 and a knob or treadle 18.

The user, who stands close to the knob 18 (or treadle) can select an attitude on the screen 7 and take a picture of himself at the proper instant, in any desired position, by depressing said knob (or treadle), which at the same time operates, if need be, a magnesium lamp.

It will be understood that the invention is not limited to the above-described details of embodiment, which have been given by way of example only.

It is to be noted that arm 15 carrying the oscillograph can be replaced, as shown in Fig. 2 by a hinged parallelogram having two sides which will at all times remain vertical, one side being constituted by axis 16 and the other by the perpendicular to the geometric axis of oscillograph 6, so that the fluorescent screen can occupy an infinity of positions, corresponding to the various directions in which the user's gaze may be directed, while remaining at all times tangent to a portion of a spherical surface.

Having now described my invention what I claim as new and desire to secure by Letters Patent is:

1. In combination with an optical camera, means for forming an image on said optical camera and on a television camera, which comprise a finder objective forming an image of the user of said optical camera, means on the path of the light rays behind said finder objective for converting the light energy into electrical energy, an amplifier connected with said last-named means, means connected to said amplifier for reconverting the electrical energy into an optical image of increased brightness, a movable screen for receiving said last-named image and exhibiting the latter to the user placed in front of said optical camera, whatever may be the direction of the user's gaze, means for moving said screen around a pivot located close to said user, and means for operating the optical camera from the place occupied by the user, whereby, upon operation of said last-named means by the user, the picture taken by said optical camera duplicates the image of the user as exhibited to him on said screen.

2. In combination with an optical camera, means for forming an image on said optical camera and on a television camera, which comprise a finder objective, an electronic camera on the cathode of which said finder objective forms an image of the user placed in front of said optical camera, an amplifier connected with said electronic camera, a receiver fed by said amplifier and having a movable luminescent screen exhibiting to the user, whatever may be the direction of his gaze, an image of increased brightness and corresponding to the image formed by said finder objective on said cathode, means for moving said receiver around a pivot located close to said user, and means for operating said optical camera from the place occupied by said user, whereby, upon operation of said last-named means by the user, the picture taken by said optical camera duplicates the image of said user as exhibited to him on said screen.

3. In combination with an optical camera, means for forming an image on said optical camera and on a television camera, as claimed in claim 1, and in which said finder objective is constituted by the objective of said optical camera.

4. In combination with an optical camera, means for forming an image on said optical camera and on a television camera, as claimed in claim 1, and in which said finder objective is an auxiliary objective located adjacent to said optical camera.

5. In combination with an optical camera, means for forming an image on said optical camera and on a television camera, as claimed in claim 1, and in which said finder objective is an auxiliary objective located close to the objective of said optical camera.

6. In combination with an optical camera, means for forming an image on said optical camera and on a television camera, as claimed in claim 2, and in which said means for moving said receiver are movable in two intersecting planes.

JEAN THEODORE FOUFOUNIS.

REFERENCES CITED

The following references are of record in the file of this patent:

UNITED STATES PATENTS

| Number | Name | Date |
| --- | --- | --- |
| 2,006,812 | Nicolson | July 2, 1935 |
| 2,420,197 | Rosenthal | May 6, 1947 |
| 2,420,198 | Rosenthal | May 6, 1947 |
| 2,426,752 | Sceli | Sept. 2, 1947 |

FOREIGN PATENTS

| Number | Country | Date |
| --- | --- | --- |
| 598,491 | Germany | June 11, 1934 |